United States Patent [19]
Andersson

[11] Patent Number: 5,889,263
[45] Date of Patent: Mar. 30, 1999

[54] APPARATUS AND A METHOD FOR INDUCTION SEALING

[75] Inventor: Mikael Andersson, Ronneby, Sweden

[73] Assignee: Tetra Laval Holdings & Finance S.A., Pully, Switzerland

[21] Appl. No.: 820,939

[22] Filed: Mar. 19, 1997

[30] Foreign Application Priority Data

Mar. 20, 1996 [SE] Sweden ................................ 9601067

[51] Int. Cl.[6] ............................... H05B 6/40; H05B 6/10
[52] U.S. Cl. ..................... 219/633; 219/647; 219/675; 219/676; 156/272.4; 156/379.6
[58] Field of Search .................... 219/633, 647, 219/672, 673, 675, 676; 156/272.4, 274.2, 379.6, 379.7, 380.2; 53/329.2, 370.7, DIG. 2

[56] References Cited

U.S. PATENT DOCUMENTS

| | | | |
|---|---|---|---|
| 2,620,415 | 12/1952 | Seiler, 3rd | 219/633 |
| 3,399,258 | 8/1968 | Leatherman | 219/633 |
| 3,548,140 | 12/1970 | O'Neill | 219/633 |
| 4,230,923 | 10/1980 | Jeppsson | 219/633 |
| 4,637,199 | 1/1987 | Steck et al. | 156/272.4 |
| 4,704,509 | 11/1987 | Hilmersson et al. | 219/633 |
| 5,117,613 | 6/1992 | Pfaffmann | 219/633 |
| 5,250,140 | 10/1993 | Hayashi et al. | 156/380.5 |
| 5,649,407 | 7/1997 | Blomqvist | 53/374.8 |

*Primary Examiner*—Philip H. Leung
*Attorney, Agent, or Firm*—Burns Doane Swecker & Mathis L.L.P.

[57] ABSTRACT

A method and apparatus for induction sealing of a packaging material which includes a layer of aluminum foil. The apparatus includes an inductor with two parallel slightly spaced apart conductors which are disposed in an electrically insulated carrier portion. The conductors are connected to one another and to a high frequency current source by two transverse conductors. The transverse conductors are placed in the upper surface of the inductor and coincide with the outer defining lines of a flat-laid tube of packaging material.

6 Claims, 3 Drawing Sheets

APPARATUS AND A METHOD FOR INDUCTION SEALING

TECHNICAL FIELD

The present invention relates to an apparatus for sealing thermoplastic coated packaging material including at least one layer of metal foil, preferably aluminium foil ('Alifoil'), the apparatus comprising an inductor which is connectable to a high frequency current source and which displays at least two parallel, slightly spaced-apart conductors, and an electrically insulated carrier portion.

The present invention also relates to a method for sealing a packaging material displaying at least one thermoplastic layer and a layer of metal foil, preferably aluminium foil ('Alifoil'), disposed adjacent the thermoplastic layer, the sealing operation being carried out by means of an apparatus, a so-called inductor, which displays two parallel conductors which are connected to one another and to a high frequency current source, by means of which an electric current of high frequency is induced in the metal foil layer of the packaging material, from which heat generated by the current is conducted to the thermoplastic layer which is caused to melt, mutually united and compressed layers of the packaging material being bonded to one another by fusion of the mutually facing thermoplastic layers for the formation of a tight and durable joint seal.

BACKGROUND ART

It has long been known in the packaging industry to employ packaging materials comprising core layers of, for example, paper or paperboard and outer layers of thermoplastic, which outer layers may be sealed to one another by fusion after heating and compression, so as obtain tight and durable sealing joints or seams.

According to one method of production of single-use disposable packages which has been put to large scale use, a web of packaging material is formed into a tube in that the longitudinal edges of the web are united to one another in an overlap joint and the web edges are sealed to one another. The thus formed tube can then be filled with the intended contents, such as, for example, liquid or pumpable foods, whereafter the filled tube is divided into individual packaging containers by transverse sealing of the tube along narrow zones which are applied in uniform spaced apart relationship from one another. Thereafter, the closed tube sections are separated from the rest of the tube, for the formation of individual packaging containers.

The sealing of the packaging material will be considerably facilitated if the packaging material includes a layer of metal foil, preferably aluminium foil, which also constitutes the barrier layer of the packaging material and protects the enclosed product. By inducing, in the aluminium layer of the packaging material, electric currents with the aid of a so-called inductor or coil which basically consists of an electric conductor formed into the desired configuration and forming one or more coil turns which are connected to a current source which supplies the coil with high frequency alternating current. Frequencies of 500 kHz and 1.8 MHz are generally employed.

When a high frequency current is passed through the coil or inductor, a high frequency magnetic field occurs around the coil or inductor and, if the coil is placed adjacent a material which includes a metal layer, induction currents are induced in this metal layer which give rise to a heat generation in those parts where the current is led. The heat generated in the metal foil layer is readily conducted over to adjacent layers of thermoplastic such as, for example, polyethylene, which are thereby caused to soften or melt. If the material layers in which heat is generated are compressed against another similar material layer with a thermoplastic coating, the thermoplastic coatings will, in the region of the heating, fuse together for the formation of a tight and durable seal joint.

In order to concentrate the magnetic field and obtain narrow heating zones, it is appropriate to dispose the inductor as close to the metal layer as possible, i.e. the inductor should be pressed against the material which is to be sealed. In order further to improve the sealing joint, the inductor may be designed so that the surface of the inductor facing towards the packaging material is provided, along a part of its surface, with a projecting ridge in order further to amplify the sealing pressure. An inductor according to the above description is disclosed in, for example, Swedish Patent Specification SE-451 974.

One problem inherent in all inductors of the above-outlined type is, however, the difficulty in obtaining a uniform seal transversely across the entire surface which is constituted by the flat-laid packaging material tube so that both the central zone of the transverse seal and the edge zone will have a tight and durable seal. When the induced current reaches the edge of the packaging material web, there is nothing to conduct the current further, with the result that, when the current approaches the packaging material edge, it deflects gradually off to the opposite side where the current is counter-directed. There will thus be a lower current density and thereby lower power output density furthest out towards the edge of the packaging material. Previously, this has been compensated for by increasing the power output so that it is sufficient also to seal right out to the outermost edge of the packaging material.

For packed products of a liquid nature, such as, for instance water, juice or milk, a power output increase to compensate for reduced power output density at the edge of the material web functions quite satisfactorily, but for thick or viscous products such as, for example, tomato purée or paste and the like, it has proved extremely difficult to obtain a tight and uniform seal joint transversely across the entire packaging material tube, since it is not possible to raise the power output limitlessly. An excessive high power output will negatively affect the central region of the packaging material tube, in that the thermoplastic is converted in plastic droplets, so-called plastic spray, which may affect the tightness and quality of the finished package.

OBJECTS OF THE INVENTION

One object of the present invention is to realise an inductor which provides a uniform and tight seal joint along the entire transverse seal and which may also be employed when viscous products are to be packed in the material tube.

A further object of the present invention is to realise an inductor which can work at a power output level which gives a seal of as equally good quality in the edge of the packaging material web as in its central region.

SOLUTION

These and other objects have been attained according to the present invention in that the apparatus of the type described by way of introduction has been given the characterizing feature that the two conductors are connected to one another and to the current source by means of transverse conductors placed in the upper surface of the inductor and arranged such that they coincide with the outer defining lines of the packaging material.

These and other objects have further been attained according to the present invention in that the method of the type described by way of introduction has been given the characterizing feature that transverse conductors placed in the upper surface of the inductor coincide with the outer defining lines of the packaging material, the transverse conductors leading the current between the two main conductors.

Preferred embodiments of the present invention have further been given the characterizing features as set forth in the appended subclaims.

BRIEF DESCRIPTION OF THE ACCOMPANYING DRAWINGS

One preferred embodiment of the present invention will now be described in greater detail hereinbelow, with particular reference to the accompanying Drawings, in which.

DESCRIPTION OF PREFERRED EMBODIMENT

Figure 1:
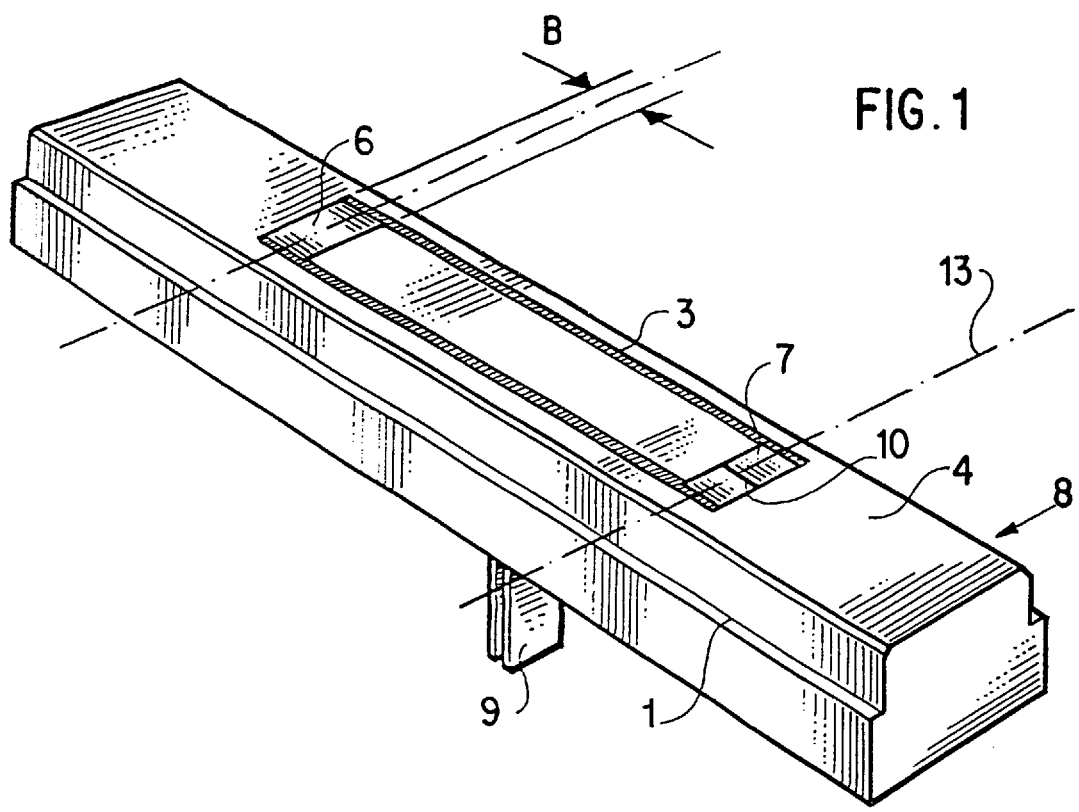
FIG. 1 shows an inductor according to the present invention.

A sealing apparatus or inductor 1 of the type shown in FIG. 1 is intended to be mounted in a machine part included in a filling machine for liquid or pumpable foods. The desired sealing movement and desired sealing pressure are imparted to the machine part. The machine part, which is often called a sealing jaw, is brought—in a relative movement—against a so-called counter jaw which may also be movable as well. The sealing operation is carried out between the sealing jaw and the counter jaw.

A packaging material web is led through the filling machine, the web being of the type which is usual in packaging material containers of the single-use disposable type, i.e. the packaging material web normally has a core layer of paper or paperboard to which are laminated different layers of thermoplastic, constituting the outer layers of the packaging material. The packaging material also includes a barrier layer of metal foil, preferably aluminium foil.

The packaging material web is given tubular form in the filling machine and, by an overlap joint, the two material edges are sealed to each other. The thus formed tube is filled with the intended contents and, thereafter, the tube is transversely sealed across a flat-laid material tube 2. The transverse joint seals are placed in uniform spaced apart relationship from one another, so that a predetermined quantity of contents is enclosed in individual tube sections. The individual tube sections are thereafter separated for forming individual packaging containers. By orienting the transverse sealing joints in different ways, for example by displacing the sealing jaws through 90° between each transverse seal, a tetrahedral package will be obtained, while, with the same orientation of the sealing jaws, a packaging container blank will be obtained which, by subsequent folding and sealing, may be given parallelepipedic configuration.

The inductor 1, which constitutes an essential part of a sealing jaw, normally consists of two parallel conductors 3 disposed in slight spaced apart relationship from one another so that there is, between the conductors 3 which each realise a transverse seal on the flat-laid material tube 2, space to be able to separate the packaging containers from the tube. The two conductors 3 are mounted in an electrically insulated carrier body 4. Each conductor 3 is designed with a narrows bead or ridge 5 which rises above the surface 8 of the inductor 1. The ridge 5 contributes in increasing the pressure on a narrow surface in order further to assist in obtaining a tight and uniform transverse joint seal. Both conductors 3 are electrically interconnected to one another and to a high frequency alternating current source (not shown).

Figure 3A:
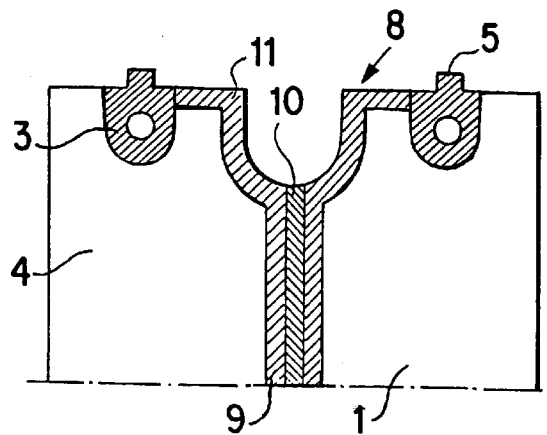
FIGS. 3A and 3B show, partly in section, a state-of-the-art inductor.
Figure 3B:
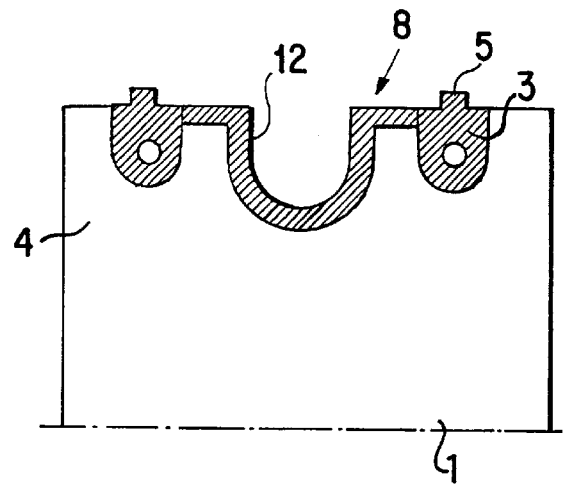
Figure 4A:
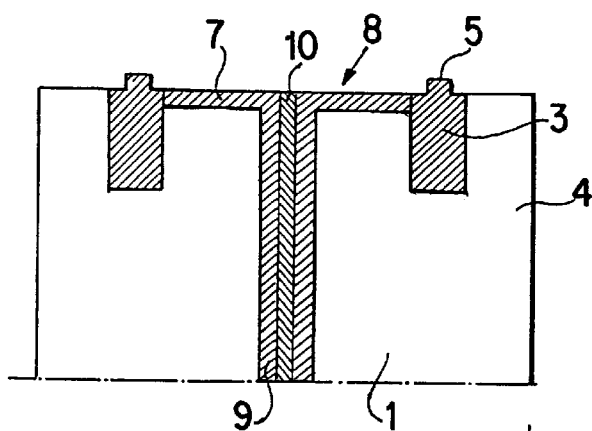
FIGS. 4A and 4B show, partly in section, an inductor according to the present invention.
Figure 4B:
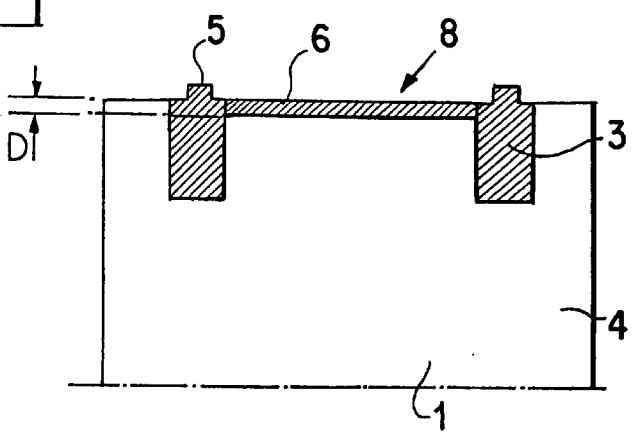

The inductor 1 according to the invention, as shown in FIGS. 1 and 4A and 4B, has transverse conductors 6 and 7 which are placed in the upper surface 8 of the inductor 1. The one transverse conductor 6 connects to interjacent ends of the conductors 3, while the other transverse conductor 7 continues in the connection lead 9 of the inductor 1 with an electric insulation layer 10 provided between the connection leads 9. In prior art inductors 1 as shown in FIGS. 3A and 3B, the transverse conductors 11 and 12 were disposed within the electrically insulated carrier body 4 so that they were not able to affect the flat-laid tube web 2 which is disposed against the surface 8 of the inductor 1. The prior art transverse connections 11 and 12 were moreover located a distance outside the outer defining lines 13 of the flat-laid material tube 2.

In the present invention, the transverse conductors 6 and 7 disposed on the surface 8 of the inductor 1 coincide with the outer defining lines 13 of the flat-laid material tube 2. In the preferred embodiment, the flat-laid material tube 2 is to be advanced through the machine such that the outer defining lines 13 coincide with the centre line of the transverse conductors 6, 7, with a tolerance of ±1.5 mm.

Since the two conductors 3 are connected to a high frequency alternating current source (not shown) via the connection leads 9, a high frequency magnetic field occurs around the inductor 1, which generates an induction current in the aluminium foil layer in the flat-laid material tube 2. The current induced in the aluminium layer generates heat, and this heat is conducted over to the adjacent thermoplastic layers so that these are caused to soften or melt. By compressing together two such thermoplastic layers in the flat-laid material tube 2, a tight transverse joint seal will be obtained.

Figure 2:
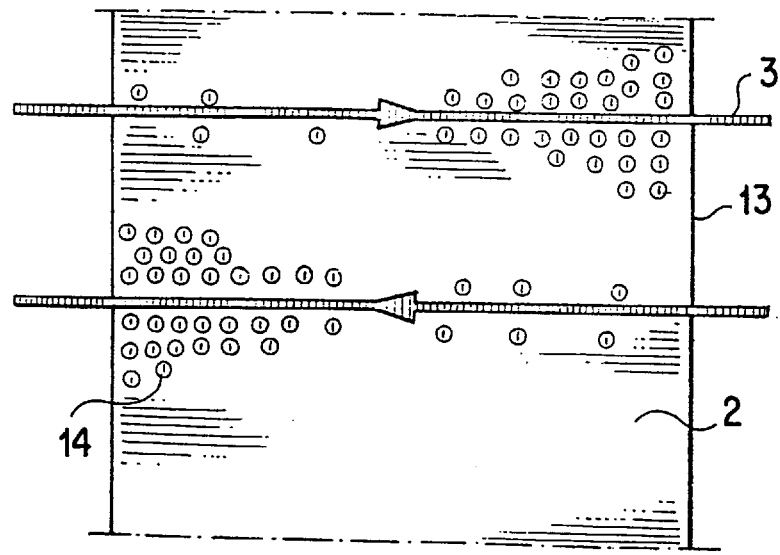
FIG. 2 shows the state of the art of inductors.

The prior art inductor 1 is illustrated in FIG. 2 where there are two parallel conductors 3 which continue outside the outer defining lines 13 of the flat-laid material web 2. The current induced in the aluminium layer is illustrated in FIG. 2 by means of electrons 14 and the flow direction is illustrated by means of arrows. When the electrons 14 reach the outer defining line 13 of the flat-laid material web 2, the electrons "pile up" where the metallic layers and there is an almost infinite resistance outside the outer defining line of the metallic layer. In such instance, the current has a tendency to "branch out", i.e. the electrons 14 begin, well before the outer defining lines 13 of the flat-laid material tube, to migrate over to the conductor 3 of the other side and, as a result, there will be a poorer seal in that region of the flat-laid material tube which is located most proximal the outer defining lines 13.

Figure 5:
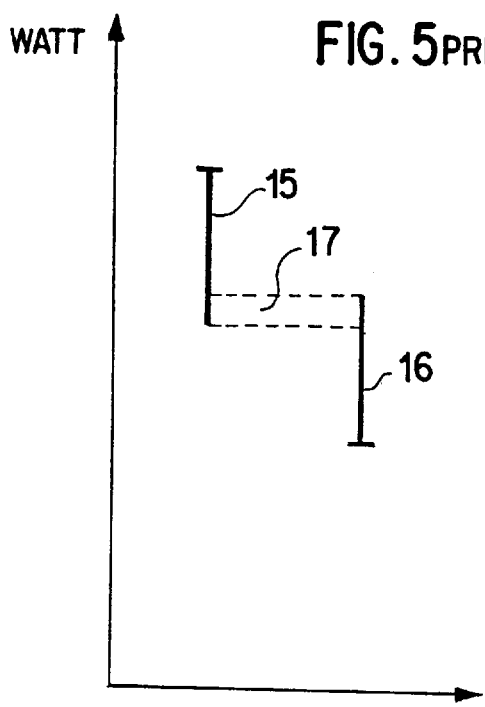
FIG. 5 is a diagram showing the sealing operation for viscous products according to the state of the art.
Figure 6:
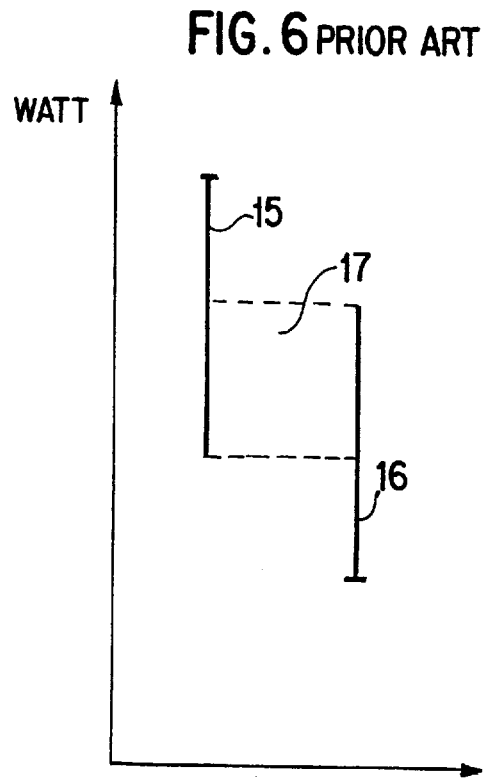
FIG. 6 is a diagram showing the sealing operation for liquid products according to the state of the art.
Figure 7:
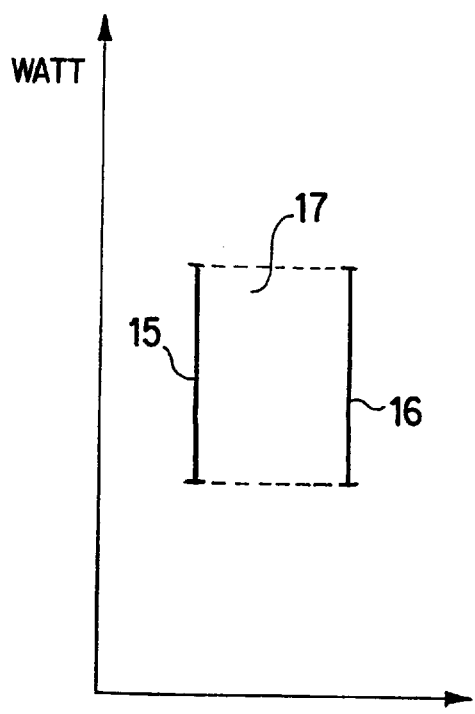
FIG. 7 is a diagram showing the sealing operation according to the present invention.

The difference in power output requirement between the edge zones of the flat-laid material tube 2 and the centre zone is illustrated in the diagrams in FIGS. 5–7. In each diagram, the left-hand power output block 15 represents the requirement which is necessary for the edge zones of the flat-laid material tube 2 and the right-hand power output block 16 represents the power output requirements of the central zone. The region 17 between the broken lines thus represents that region where a tight and durable transverse sealing joint can be obtained across the whole of the flat-laid material tube 2.

FIG. 6 shows the power output requirement blocks 15 and 16 for a transverse sealing joint in the packaging of, for example, water. In this case, a relatively wide region 17 will be obtained which can be utilised in the transverse joint sealing. In FIG. 5, which shows the power output requirement blocks 15, 16 for a viscous product, such as tomato paste, there will, on the other hand, be a very narrow region 17 which can be utilised for sealing a flat-laid material tube 2 which contains this viscous product. There are also products which it is desirable to pack in single-use disposable packages of the above-described type, but for which there is no overlapping power output region 17. This implies in practice that it has hitherto been almost impossible to seal packages containing such a product in a satisfactory manner.

It may be difficult to keep to the narrow region 17 when, after a certain time's production, the inductor 1 is heated and the power consumption must be regulated accordingly. In addition, the temperature of the packed product, the ambient temperature, and also variations in thickness of the packaging material and aluminium foil may result in the narrow power output region 17 being too small to be able to achieve an efficient and tight sealing joint throughout the entire flat-laid packaging material tube 2.

If power consumption falls below the region 17 shown by broken lines, there is a risk of obtaining a transverse joint seal of the flat-laid material tube 2 in which both of the edge zones close to the outer defining lines 13 are not sufficiently tight. If, on the other hand, power consumption is above the zone illustrated by broken lines, there is a risk of overheating the thermoplastic layer in the central zone of the flat-laid material tube 2, such that the thermoplastic forms droplets, so-called plastic spray, which, in a later treatment or handling of the finished packaging container, may cause mechanical damage to the inner plastic layer of the packaging material, with consequential untightness of the package.

To avoid the above problems which the prior art inductors 1 gave rise to, in particular in the packing of viscous products, the present invention offers, as a result of the transverse conductors 6 and 7 lying in the surface 8 of the inductor 1, a control of the current such that, when the electrons 14 reach the outer defining line 13 of the flat-laid material tube, the transverse conductors will "drive" the current further along the outer defining line 13 of the flat-laid material tube 2. In practice, this gives a sealing pattern which is of rectangular appearance, where the short sides of the rectangle are constituted by the outer defining lines 13 of the flat-laid material tube 2. The short side seals which are created by such means have, however, no function as operative seals.

By meticulous and accurate design and dimensioning of the transverse conductors, the attempt is made (as shown in FIG. 7) to place the power output requirement for both the central zone of the flat-laid material tube and its edge zones at the same interval or region 17. This applies to both liquid products and pumpable products. For example, the width B of the transverse conductors 6, 7 for their adaptation for an inductor 1 for use for viscous pumpable products, may be between 5 and 7 mm, preferably 6 mm. The depth D of the transverse conductors is selected so as to lie between 0.8 and 1.2 mm, preferably 1 mm. At the same time, it is important that the outer defining lines 13 of the flat-laid material tube 2 coincide as accurately as possible with the centre lines of the transverse conductors 6, 7. In the preferred embodiment, there is a tolerance of ±1.5 mm.

As will have been apparent from the foregoing description, the present invention realises, in an apparatus for sealing, an inductor 1 which makes possible sealing of transverse joints enclosing a viscous product and in which it is possible to employ a power output range in which there is no risk of obtaining untight sealing joints in the edge zones most proximal the outer defining lines 13 of the flat-laid material tube 2, or of overheating the thermoplastic layers in the central zone of the flat-laid material tube 2.

What is claimed is:

1. A sealing system comprising:
   a thermoplastic coated packaging material including at least one layer of metal foil and having outer edges which define outer lines of the packaging material,
   an inductor connectable to a high frequency current source, said inductor including at least two parallel, slightly spaced-apart conductors, an electrically insulated carrier portion, and a first and a second transverse conductor;
   wherein the two parallel conductors are connected to one another and to said current source by means of the transverse conductors; and
   wherein the transverse conductors are placed in an upper surface of the inductor and disposed such that they coincide with the outer defining lines of the packaging material to be sealed.

2. The system as claimed in claim 1, wherein the outer defining lines of the packaging material coincide with a centre line of the transverse conductors ±1.5 mm.

3. The system as claimed in claim 1, wherein the transverse conductors have a width and a depth dimensioned such that the power output consumption for sealing an edge zone of the packaging material is equal to the power output consumption for sealing a central zone of the packaging material.

4. A method of sealing a packaging material the sealing method comprising:
   providing a packaging material web including at least one layer of thermoplastic material, a layer of metal foil extending thereover, and having outer edges which define outer lines of the packaging material web;
   providing an inductor including two parallel conductors connected to one another and to a high frequency current source,
   inducing an electric current of high frequency in the metal foil layer of the packaging material, from which heat generated by the current is conducted to the thermoplastic layer which is caused to melt, mutually united and compressed layers of the packaging material being bonded to one another by fusion of the mutually facing thermoplastic layers for the formation of a tight and durable joint seal, p1 providing transverse conductors in an upper surface of the inductor and positioning the transverse conductors so as to coincide with the outer defining lines of the packaging material, said transverse conductors leading the current between the two main conductors.

5. The method as claimed in claim 4, wherein a rectangular sealing pattern occurs where the short sides of the rectangle consist of the outer defining lines of the packaging material.

6. An inductor sealing system comprising:
a thermoplastic coated packaging material web including at least one layer of metal foil and having outer edges which define outer lines of the packaging material,
at least two parallel, slightly spaced-apart conductors;
an electrically insulated carrier portion; and
a first and a second transverse conductor;
wherein the two parallel conductors are connected to one another and to a current source by the transverse conductors; and
wherein the transverse conductors are positioned within the inductor such that they coincide with outer edges of the packaging material web.

* * * * *